(12) United States Patent
Webster

(10) Patent No.: US 8,679,623 B2
(45) Date of Patent: Mar. 25, 2014

(54) CAST POLYMER AND RECYCLED GLASS COMPOSITE ARTICLE

(75) Inventor: John Webster, Caledonia, NY (US)

(73) Assignee: Monroe Industries, Inc., Avon, NY (US)

( * ) Notice: Subject to any disclaimer, the term of this patent is extended or adjusted under 35 U.S.C. 154(b) by 241 days.

(21) Appl. No.: 13/032,017

(22) Filed: Feb. 22, 2011

(65) Prior Publication Data

US 2011/0204540 A1    Aug. 25, 2011

Related U.S. Application Data

(60) Provisional application No. 61/306,813, filed on Feb. 22, 2010.

(51) Int. Cl.
| | |
|---|---|
| *B32B 5/16* | (2006.01) |
| *B32B 27/38* | (2006.01) |
| *B32B 9/04* | (2006.01) |
| *B32B 27/06* | (2006.01) |
| *B32B 27/00* | (2006.01) |

(52) U.S. Cl.
USPC ........ 428/325; 428/411.1; 428/413; 428/480; 428/500

(58) Field of Classification Search
None
See application file for complete search history.

(56) References Cited

U.S. PATENT DOCUMENTS

| | | |
|---|---|---|
| 6,749,932 B1 | 6/2004 | Gould |
| 2004/0102556 A1* | 5/2004 | Frank ............................ 524/401 |
| 2004/0126571 A1 | 7/2004 | Bordener |
| 2006/0121264 A1 | 6/2006 | Rha et al. |
| 2006/0270758 A1 | 11/2006 | Ong et al. |
| 2007/0203262 A1 | 8/2007 | Crossley |
| 2007/0240818 A1* | 10/2007 | Juen et al. .................. 156/307.1 |
| 2008/0161447 A1 | 7/2008 | Frank |

\* cited by examiner

*Primary Examiner* — Sheeba Ahmed

(74) *Attorney, Agent, or Firm* — LeClairRyan, a Professional Corporation

(57) ABSTRACT

A composite article and its method of manufacture are disclosed. The composite article includes a matrix formed of a mixture of glass particles and a cured polymer, and a layer of cured polymer material that is substantially free of the glass particles, said layer being formed on at least one surface of the cast article whereby the glass particles are not surface exposed on the at least one surface.

18 Claims, 2 Drawing Sheets

CAST POLYMER AND RECYCLED GLASS COMPOSITE ARTICLE

This application claims the priority benefit of U.S. Provisional Patent Application Ser. No. 61/306,813, filed Feb. 22, 2010, which is hereby incorporated by reference in its entirety.

FIELD OF THE INVENTION

The present invention is directed to cast articles, particularly those containing a composite material that includes a particulate glass system in a polymer matrix, and methods of manufacturing the same.

BACKGROUND OF THE INVENTION

The utilization of recycled materials, such as glass, metal and plastics, has been promoted over the past few decades to preserve natural resources and protect the environment, with the recycling efforts being further fostered by the hope of cost reductions in the articles produced by the recycled materials. While the economics of using recycled materials have yet to be consistently proven, the protection of our environment and preservation of our natural resources continue to favor the recycling of industrial materials and the development of new ways of incorporating those recycled materials into useful products.

The building construction industry has in recent years turned its attention to the use of recycled materials not only for environmental reasons but also in search of effective synthetic alternatives to particularly high-end natural materials, such as marble, granite, and slate as countertop, backsplash and/or flooring materials. A variety of such synthetic building materials have been developed and made in substantial part from recycled materials including rubber, glass, and thermoplastic resins. For instance, recycled glass is frequently employed and incorporated into various building products primarily as reinforcement fibers and fillers.

It would be desirable to develop a process that can reliably be used to cast articles containing recycled glass material and a polymer matrix, where the resulting articles are both environmentally friendly and sufficiently durable so as to be competitive with traditional natural materials or other composite materials used for the same purposes.

SUMMARY OF THE INVENTION

A first aspect of the present invention relates to a composite article that includes a matrix formed of a mixture comprising glass particles and a cured polymer, and a layer of cured polymer material that is substantially free of the glass particles, said layer being formed on at least one surface of the composite article whereby the glass particles are not surface exposed on said at least one surface.

A second aspect of the invention relates to a method of making a composite article, the method including the steps of: providing a mold having a mold surface that defines a mold cavity; applying a coating of an uncured thermosetting polymeric resin to the mold cavity; introducing into the coated mold a mixture comprising glass particles and an uncured thermosetting polymeric resin; and allowing the thermosetting polymeric resin to cure, thereby forming the composite article in the mold.

This invention is described in preferred embodiments in the following description with reference to the Figures, in which like numbers represent the same or similar elements.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. As used herein to describe various wt % ranges, the term "about" is intended to mean±1 percent, or more specifically±0.5 percent; for other ranges, the term about is intended to mean±1 unit of measure, or more specifically±0.5 units of measure.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Because, as discussed more fully below, the majority of ingredients used in forming the cast composite articles may be reclaimed from either post-consumer or post-industrial waste streams, the post-consumer recycled content can be as high as about 84 percent by weight. Further, when used in combination with a bio-based thermosetting polymeric resin, the resulting product can be made with as high as about 95% recycled and/or renewable components. This is considered a "green" building material that can help qualify for LEED (Leadership in Energy and Environmental Design) points in construction projects. Composite articles formed in accordance with the present invention, now sold under the tradename ROBAL (stylized)® glass, were recognized at the American Composites Manufacturers Association (ACMA) Composites 2010 Tradeshow (Feb. 9-11, 2010) as the Pinnacle Award winner, best in show, for demonstrating innovation and creativity in cast polymer design and application. At the ACMA Composites 2011 Tradeshow (Feb. 2-4, 2011), two additional Pinnacle Awards were received. ROBAL(stylized)® glass won the Pinnacle, Cast Polymer Excellence Award for best installation (on a vanity countertop) demonstrating innovation and creativity in cast polymer design; and RO-BELLA™, formed using a combination of recycled glass and recycled gemstones, won the Pinnacle, Cast Polymer Design Award for innovation and creativity in cast polymer design and application. Thus, the composite articles of the present invention have consistently been recognized within the industry for creativity and innovation.

DETAILED DESCRIPTION OF THE INVENTION

Figure 1:
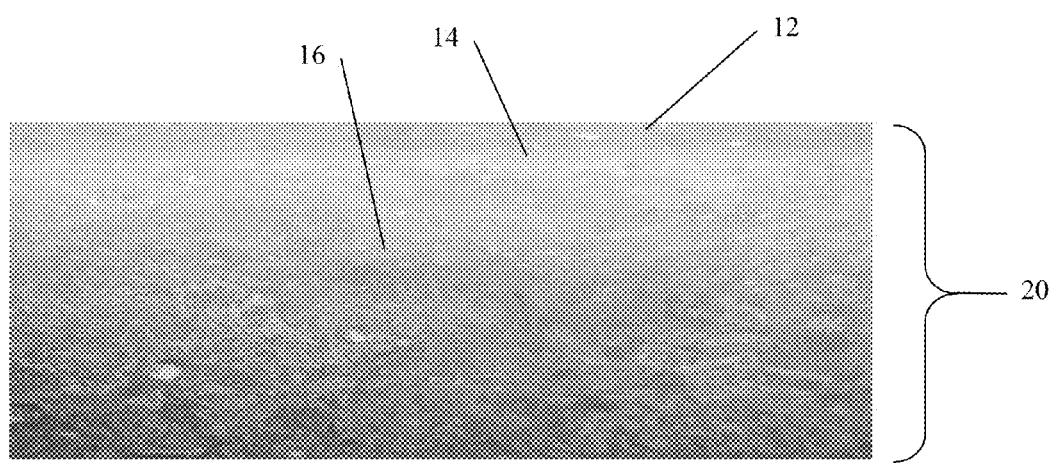
FIG. 1 is a cross sectional view of a cast, composite product of the present invention.

The present invention relates to a composite article and methods of manufacturing the same.

The composite articles of the invention include a matrix formed of a mixture containing glass particles and a cured polymer. In one embodiment, the composite articles also include a layer of cured polymer material that is substantially free of the glass particles, with the layer being formed on at least one surface of the composite article whereby the glass particles (within the matrix) are not surface exposed on the at least one surface. Because the polymer material is sufficiently light transmissive, the glass particles in the matrix are easily observed.

In certain embodiments, the glass particles are formed of recycled glass or post-industrial glasseous mineral waste. In terms of low cost production, recycled glass is one preferred filler because of its ready availability, color selection, and cost. In using recycled materials, the inventive products can minimize or eliminate problems recognized with casting glass or glasseous materials, while at the same time producing an aesthetically pleasing decorative product.

The glass particles used to prepare the composite articles of the present invention are present in an amount of at least about 50 wt %, based on the total weight of the matrix. More preferably, the glass particles are present in an amount of about 60 wt % to about 95 wt %, based on a total weight of the matrix material. Most preferred is a glass particle content of about 70 wt % up to about 90 wt %, based on a total weight of the matrix material. In certain embodiments, the glass particle content is about 84 wt %, based on a total weight of the matrix material.

In certain embodiments, the glass particles comprise about 60 wt %, based on the total weight of the composite material, of post consumer and/or post industrial recycled glass. In certain embodiments, the glass particles comprise about 75 wt % to about 85 wt %, based on the total weight of the composite material, of post consumer and/or post industrial recycled glass. In certain embodiments, the glass particles comprise greater than 95 wt % or even entirely post consumer and/or post industrial recycled glass.

In certain embodiments, the average particle size of the glass particles is up to about 0.07 mm. In certain embodiments, the average particle size of the glass particles ranges from about 0.07 mm to about 0.6 mm. In other embodiments, the average particle size of the glass particles ranges from about 0.6 mm to about 10 mm. In certain embodiments, the average particle size of the glass particles is greater than 10 mm.

In certain embodiments, the glass particles include a single type of glass particles having a given average particle size or a range of particle sizes. In other embodiments, the glass particles include a combination of two or more types of glass particles, each having a different average particle size or a different range of particle sizes. The ranges of particle sizes between the two types can be overlapping or non-overlapping. By selecting a combination of different sizes of glass particles, it is possible to achieve a glass density that is sufficient to ensure minimal voids within the product. The glass particles preferably comprise a mixture of differently sized, irregularly shaped glass particles. The color of glass particles used in each size range can vary as desired.

In certain embodiments, the glass particles comprise about 20 wt % to about 70 wt % (based on the total weight of glass particles) of a first type of glass having an average particle size from about 0.07 min to 0.6 mm, and about 30 wt % to about 80 wt % (based on the total weight of glass particles) of a second type of glass having an average particle size from about 0.6 mm to about 10 mm. The color of glass particles used in each size range can vary as desired.

In another embodiment, the glass particles comprise about 20 to about 25 wt % (based on the total weight of glass particles) of a first type of glass having an average particle size from about 0.07 min to 0.6 mm (30 to 50 mesh), about 20 to about 25 wt % (based on the total weight of glass particles) of a second type of glass having an average particle size from about 0.6 mm to about 1.2 mm (16 to 30 mesh), about 20 to about 25 wt % (based on the total weight of glass particles) of a third type of glass having an average particle size from about 1.2 mm to about 2.4 mm (8 to 16 mesh), and about 25 to about 40 wt % (based on the total weight of glass particles) of a fourth type of glass having an average particle size from about 2.4 mm to about 6.35 mm (8 mesh to quarter inch).

In a further embodiment, the glass particles comprise about 3 to about 8 wt % (based on the total weight of glass particles) of a first type of glass having an average particle size of less than about 0.07 mm (<50 mesh), about 8 to about 12 wt % (based on the total weight of glass particles) of a second type of glass having an average particle size from about 0.07 mm to 0.6 mm (30 to 50 mesh), about 8 to about 12 wt % (based on the total weight of glass particles) of a third type of glass having an average particle size from about 0.6 mm to about 1.2 mm (16 to 30 mesh), about 30 to about 40 wt % (based on the total weight of glass particles) of a fourth type of glass having an average particle size from about 1.2 mm to about 2.4 mm (8 to 16 mesh), and about 25 to about 35 wt % (based on the total weight of glass particles) of a fifth type of glass having an average particle size from about 2.4 mm to about 6.35 mm (8 mesh to quarter inch), and about 8 to about 12 wt % (based on the total weight of glass particles) of a sixth type of glass having an average particle size from about 6.35 mm to about 9.51 mm (quarter to three-eighths inch). The color of glass particles used in each size range can vary as desired.

In one preferred embodiment, the composite article is formed using a mixture of recycled glass particles as follows: about 5 wt % (based on the total weight of glass particles) of a first type of glass having an average particle size of less than about 0.07 mm (<50 mesh), about 10 wt % (based on the total weight of glass particles) of a second type of glass having an average particle size from about 0.07 mm to 0.6 mm (30 to 50 mesh), about 10 wt % (based on the total weight of glass particles) of a third type of glass having an average particle size from about 0.6 mm to about 1.2 mm (16 to 30 mesh), about 35 wt % (based on the total weight of glass particles) of a fourth type of glass having an average particle size from about 1.2 mm to about 2.4 mm (8 to 16 mesh), and about 30 wt % (based on the total weight of glass particles) of a fifth type of glass having an average particle size from about 2.4 mm to about 6.35 mm (8 mesh to quarter inch), and about 10 wt % (based on the total weight of glass particles) of a sixth type of glass having an average particle size from about 6.35 mm to about 9.51 mm (quarter to three-eighths inch).

Different color combinations of glasses and particles sizes can be mixed together to produce an array of different products having different appearances. For example, clear, brown, green, and blue glass particles can be used alone or in various combinations to produce a spectrum of colors for the finished product.

In addition, other inorganic fillers can be introduced in amounts up to about 20 wt %, more preferably up to about 15 wt %. Exemplary inorganic fillers include, without limitation, crystalline silica, amorphous silica, mica, ceramics, minerals, and gemstones, particularly those recycled from various industrial or commercial waste streams. One embodiment of such an articles include a matrix prepared using about 15 to about 16 wt % of a bio-based polyester resin, about 8 to about 9 wt % of particular minerals and/or gem stones, and about 76 to about 77 wt % of particular recycled glass of varying sizes from less than 0.07 mm up to about 9.51 mm.

The cured polymer used in forming the matrix is preferably the cured product of a thermosetting polymer resin, which is present in an amount of up to about 50 wt %, based on the total weight of the matrix. More preferably, the thermosetting polymer resin is present in an amount of about 5 wt % to about 40 wt %, based on a total weight of the matrix material. Different ranges of the resin will be preferred depending the amount of fine glass particles used to form the matrix. For example, while about 10-20 wt % may be suitable for forming matrices with less fine particles, about 20-40 wt % may be preferred for matrices with high fine particle content. Use of higher resin content in the latter ensures that the mixture remains pourable prior to cure.

As used herein, the term "thermosetting polymer resin" refers to a compound and/or mixture thereof, which upon initiation of polymerization (i.e., using an appropriate catalyst or initiator) becomes viscous such that it can be poured into preformed molds and then cured to a solid form. The compounds or mixture, prior to curing, includes liquid monomers and/or oligomers that contain one or more functional groups that are capable of cross-linking to form the polymer matrix.

Suitable thermosetting polymer resins include, without limitation, vinyl ester resins, unsaturated polyester resins, epoxy resins, amino resins, phenolic resins, and combinations thereof.

Vinyl ester resins form polymeric molecules wherein the individual monomers are linked to each other via ester bonds. Reactive vinyl groups are situated at the terminal ends of the polymer molecules, thus yielding the trivial generic name "vinyl esters." One example includes vinyl ester resins based upon bisphenol A (see, e.g., U.S. Pat. No. 4,375,489, which is hereby incorporated by reference in its entirety). Vinyl ester resins are readily available from numerous international commercial suppliers, including Dow Chemical Co. (Midland, Mich., USA), Superior Polymer Products (Calumet, Mich., USA), Fibre Glast Developments Corp. (Brookville, Ohio, USA), and Mechemco Industries (Mumbai, India).

Acrylic resins are the acid form of acrylate resins, which include vinyl ester groups. Both acrylic and acrylate resins are contemplated for use in accordance with the present invention. Acrylic/acrylate resins are available from a number of commercial suppliers. Exemplary acrylate resins include, without limitation, (meth)acrylates including alkyl (meth) acrylates, aminoalkyl (meth)acrylates, and polymethylmethacrylate (PMMA).

Unsaturated polyester resins are closely related to vinyl esters but include reactive carbon-carbon double bonds within the backbone of the polymer chain (rather than solely at the termini). Typical examples of unsaturated polyester resins include resins based on isophthalic and/or orthophthalic acid esters. Unsaturated polyester resins can be obtained from the same (and many other) commercial suppliers listed above.

Epoxy resins include reactive ethylene oxide moieties that function to link the individual monomers into a thermoset plastic. Typical examples of epoxy resins include styrenated epoxy vinyl ester resin and bisphenol-epoxy vinyl ester resin. Epoxy resins can be obtained from the same (and many other) commercial suppliers listed above.

Preferred polymeric resins are thermosetting bio-based polyester resins. Soy-based polyester resins are unsaturated resins derived from soybeans and formed by the reaction of dibasic organic acids and polyhydric alcohols. Such resins are readily available from numerous international commercial suppliers, including Ashland Chemical Co. (Ashland, Ohio, USA).

The cured polymer product can also include a number of additional components including, without limitation, a coupling agent, a wetting agent, an air release agent, a coloring agent, a cross-linking agent, a polymerization initiator, and microbicides or other antimicrobial agents.

The coupling agent is a chemical substance capable of reacting with both the glass particles and the resin matrix of a composite material. Any suitable coupling agent can be used in accordance with the present invention. Exemplary coupling agents include, without limitation, silane-based coupling agents, titanate-based coupling agents, aluminum-based coupling agent, and polymer coupling agents such as BYK® C8000. The coupling agents can be introduced in amounts up to about 10 wt %, relative to the total weight of the resin, more preferably up to about 5 wt %. Of these, BYK® C8000 is preferred and is used in amount up to about 1 wt %, more preferably about 0.1 to about 0.5 wt %.

The wetting agent is a chemical substance that reduces the surface tension of the liquid polymer resin, i.e., prior to curing, and therefore is useful in allowing the polymer resin to produce a matrix that is substantially free of voids by causing the liquid resin to spread between the glass particles prior to curing. Any suitable wetting agent can be used in accordance with the present invention. Useful wetting agents include boric acid ester such as BYK®-W909. The wetting agents can introduced in amounts up to about 1.5 wt %, relative to the total weight of the resin, more preferably up to about 1 wt %, most preferably between about 0.1 to about 1 wt %.

The air release (or de-foaming) agent is a chemical substance that promotes the elimination of air in the polymer systems. Any suitable air release agent can be used in accordance with the present invention. Useful air release agents include BYK®-A 555. The air release agents can be introduced in amounts up to about 1.5 wt %, relative to the total weight of the resin, more preferably up to about 1 wt %, most preferably between about 0.3 to about 1 wt %.

The coloring agent is an aesthetic additive that can be any pigment or dye, which when used in combination with the glass particles achieves a desired effect. The coloring agent can be introduced in amounts up to about 1.5 wt %, relative to the total weight of the resin, more preferably up to about 1 wt %, most preferably between about 0.01 to about 0.5 wt %.

A cross-linking agent is a substance that promotes or regulates intermolecular covalent bonding between polymer chains, linking them together to create a more rigid structure. Any suitable cross-linking agent can be selected based on the resin system employed. Exemplary cross-linking agents suitable for unsaturated polyester resins include methyl methacrylate and other acrylate-functional agents of the type described in U.S. Pat. No. 4,192,685, which is hereby incorporated by reference in its entirety. The cross-linking agents can be introduced in amounts up to about 2 wt % without contributing to excessive shrinkage.

The polymerization initiator is an agent that catalyzes the polymerization of the thermosetting polymer resin. A number of suitable catalysts are known in the art and are widely available commercially. The choice of thermosetting polymer resin will dictate the choice of available polymerization initiators, and the amounts that should be used to effect catalyzing the polymerization reaction. For polyester and vinyl-containing monomers, methyl ethyl ketone peroxide (MEKP) is a preferred initiator. The polymerization initiator can be used in any effective amount, usually up to about 2.5 wt %, more preferably about 0.1 up to about 2 wt %, most preferably about 1 to about 2 wt %. The temperature of the system may also influence the amount of polymerization initiator to be introduced.

Microbicides and antimicrobial agents are optional, because products of the present invention have been shown to resist microbial attack. However, small but effective amounts of these agents can be utilized in the practice of the invention, including both organic and inorganic antimicrobial agents. A number of these agents that can be incorporated into polymer matrices include those described in U.S. Patent Application Publ. No. 20060270758, which is hereby incorporated by reference in its entirety.

The composite products produced in accordance with the present invention can serve a wide variety of purposes. Importantly, the finished part is without surface defects or significant warping caused by particulate settling. Moreover, once removed from the mold, the product requires no surface treatment to obtain a finished product suitable for its intended use. Furthermore, the method of preparing these composite products allows for the manufacture of decorative parts which exceed all performance standards for wall cladding, countertop production, bathroom fixture production, such as, and without limitation, shower base, countertop, table top, panel, or threshold.

Composite articles of the present invention have passed ANSI Standard Z124.3 for plastic lavatory units (including testing for impact resistance, wear and cleanability, cigarette burn resistance, chemical resistance, thermal shock resistance, stain resistance, surface integrity, ignition testing, structural and load testing, and drain fitting capacity) as well as ASTM D-2565 for color fastness (145+9° F.), and ASTM testing for fungi and bacteria resistance.

FIG. 1 is a cross sectional image of a product 20 according to one aspect of the invention. This product is prepared as described herein using entirely recycled glass and a bio-based polyester resin. The layer of cured polymer material that is substantially free of the glass particles is denoted as 12. This layer is formed on all "finish" sides of the composite article, and the matrix containing the glass particles, designated 16, are not surface exposed on any of these finished surfaces. Between the layer 12 and matrix 16 is a very thin layer 14, which is formed of the same polymer used for the matrix. Layer 14 may or may not be present in the finished product, as discussed below.

Figure 2:
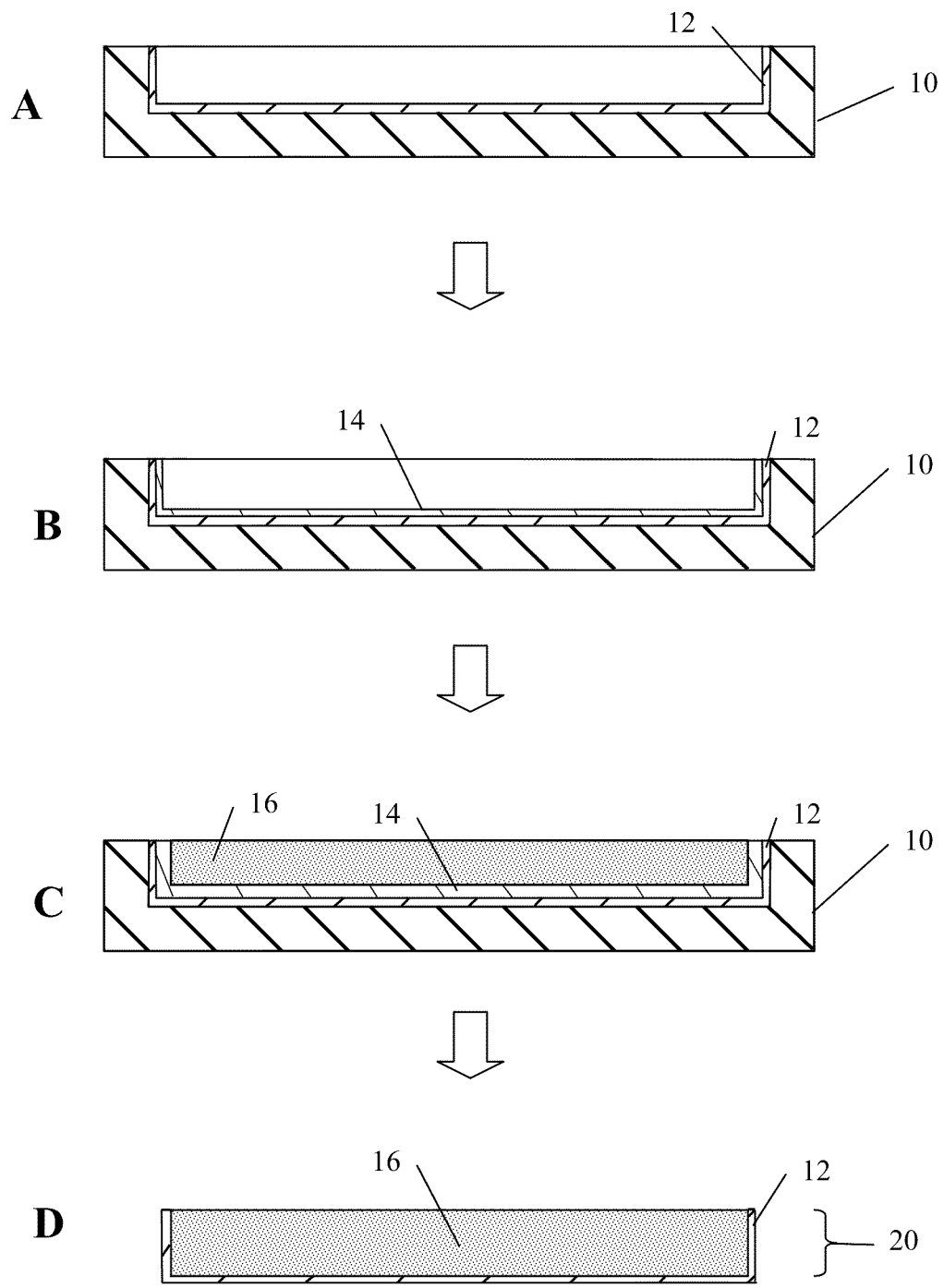
FIG. 2 illustrates a process for preparing a cast article of the present invention. The mold and product are illustrated in cross sectional views at each step of the process.

Referring now to FIG. 2, a second aspect of the invention relates to a method of making a composite article of the invention using an open molding process.

Generally, the method includes the steps of: providing a mold having a surface that defines the mold cavity; applying a coating of an uncured thermosetting polymeric resin to the mold cavity; introducing into the coated mold a mixture comprising glass particles and an uncured thermosetting polymeric resin; and allowing the thermosetting polymeric resin to cure, thereby forming the composite article in the mold.

The mixture is first prepared by combining the various resin components and any accessory ingredients noted above, including the coupling agents, wetting agents, and air release agents, into a mixing vessel of an industrial mixer. The polymerization initiator is introduced last, and blended for a sufficient duration, typically about 5 minutes. Importantly, before introducing the glass particles, a portion of the mixture is withheld to be separately applied to the mold prior to the article being cast. In certain embodiments, the amount withheld is equal to 0.5 grams per square inch of the product being cast. In certain embodiments, the amount withheld is between about 0.5 grams and 2 grams per square inch of the product being cast. In certain embodiments, the amount withheld is 5% to 40% of the total mixture, depending on the size of the cast part.

In one embodiment, the mold surface is first coated with a thermosetting polymeric resin of the type described above, preferably a polymer gel coat, and allowed to cure at least partially prior to applying the coating of the (withheld) uncured thermosetting polymeric resin to the mold cavity. The partial cure time is typically about 15 to about 25 minutes. The polymer gel coat should be compatible with the polymer resin used in the matrix. Suitable polyester gels compatible with the preferred bio-based polyester resin include, without limitation, polyester NPG/ISO gel coats either with or without an additive for abrasion resistance, such as aluminum oxide or the like. In this embodiment, the polyester gel coating is sprayed or brushed directly onto the mold surface to a dimension of about 0.3 to about 1.0 mm, preferably about 0.5 mm. By allowing this first coating only to partially cure, the polymer component of the matrix formulation is allowed to cross-link with the partially cured coating applied directly to the mold surface. Thus, the withheld resin can be applied directly to the mold surface or to a previously coated mold surface. As shown in FIG. 2, step A, the provided mold 10 includes the at least partially cured polymer layer 12 that is formed using the polymer gel coat.

Application of the withheld resin to the mold cavity (or gel-coated cavity) can be carried out by any suitable means, preferably by spraying or brushing the uncured thermosetting polymeric resin into the mold cavity. This is illustrated at FIG. 2, step B, wherein the withheld resin layer is applied as layer 14.

To the remaining portion of the polymer resin composition, the glass particles are introduced into the mixing vessel and mixed to homogeneity, typically 1 to 2 minutes. This will help to avoid having regions of the cast article that possess too little resin.

Introduction of the mixture into the mold is carried out by pouring the mixture into the open mold cavity. At first the mold is only partially filled (approximately half-filled), during which time the mold and its contents are vibrated using a commercial vibrating apparatus and the mixture is compacted within the mold using a trowel or similar tool. Application of the withheld resin to the polymer-coated mold surface creates a surface layer of resin that allows the glass particles to interlock and pack more thoroughly during compaction. The surface layer of resin effectively works its way into the matrix (i.e., is forced up) as the glass compacts toward the mold surface. This aids in forming a less porous/more dense product.

After sufficient compaction, the mold cavity is completely filled with the remaining mixture and the mixture is screeed to level the back side of the mold, again with continued vibration. This process is illustrated at FIG. 2, step C.

The molded contents are allowed to cure for a suitable amount of time, which will vary according to the cure temperature as well as the size and structure of the article being fabricated. The cure time is typically about 60-120 minutes, although more or less time may be allowed. Importantly, heating during or after curing is not required, and application of pressure to the mold cavity during curing is not required.

The cure temperature may vary from ambient (70° F.) up to about 180° F. In certain embodiments, the temperature is between about 70° F. up to about 100° F. In other embodiments, the temperature is at least 120° F. up to about 180° F. Heating subsequent to curing can be performed as desired.

Upon removal from the mold, the cured article can then be finished, if necessary, by any means known in the art. However, the need to finish the exposed surface of the part—beyond removal from the mold—can be omitted entirely through the application and curing of a first polymer coating (e.g., the above-noted polymer gel coat) to the mold surface. This is illustrated at FIG. 2, step D. As noted above, this polymer layer 12 prevents the glass particles from being exposed on the finished surfaces of the composite article.

As an option, the unfinished surface (i.e., the surface of the matrix distal from layer 12) can be sealed with a low viscosity thermosetting polymer resin that is compatible with the resin used for the matrix. This helps to avoid any capillary action of moisture through the matrix. The low viscosity thermosetting polymer resin preferably includes a tack free additive (e.g., wax additive) and a catalyst of the type described above. A number of suitable tack free additives are known in the art and are compatible with various polymer coating systems.

It should also be noted that layer 14 is omitted from FIG. 2, step D, where the finished product 20 is illustrated, because as noted above the compaction process at step C effectively causes the uncured resin of layer 14 to work its way into the matrix (i.e., is forced up) as the glass compacts toward the mold surface. Depending on how thick layer 14 is applied and the extent of compaction, layer 14 may or may not be present in the final product.

The particulate formulation in combination with the above-described method offers several advantages over the prior art. For example, when clear and semi-clear glass and crystals are used, this high percentage of glass results in a composite article that is translucent, thereby lending itself well to applications utilizing backlighting, if so desired. Furthermore, the majority of ingredients used may be either post-consumer or post-industrial waste streams, allowing the post-consumer recycled content to be as high as 93%. Additionally, also noted above, application of the optional polymer coating to the mold surface prior to casting results in a finished product that does not require surface treatments, such as abrading, scoring, polishing, etc., to obtain a finished part. However, when the optional polymer coating is not utilized, fissures and air pockets on the surface of the article may be filled with a thermoset resin, making the surface of the final product free of defects. Such thermoset resins are widely available and commonly used to fill similar defects in real stone slabs. In certain embodiments, the thermoset resin used may be a UV curable paste. The use of thermoset resins to eliminate surface defects means that parts do not have to be vacuum casted. Finally, as will be appreciated by one of ordinary skill in the art, the particle distribution of the particulate formulation minimizes air entrapment and additionally eliminates the separation of particle sizes during the vibration process that is utilized.

Once the part has been cast and fully cured, it can be installed as desired. If any cuts are made to the article in the field, during installation, then the edges can be coated with a suitable sealant to prevent moisture from wicking into the matrix or between the polymer layer 12 and matrix 16. One exemplary sealant is AMF Safecoat DynoSeal Seam Sealer.

While the preferred embodiments of the present invention have been illustrated in detail, it should be apparent that modifications and adaptations to those embodiments may occur to one skilled in the art without departing from the scope of the present invention. For instance, although the product described herein utilizes recycled glass, it should be appreciated that other particulate materials can be similarly utilized in the same process without departing from the scope of the invention.

What is claimed:

1. A composite article comprising a matrix formed of a mixture of glass particles and a cured polymer, and a layer of cured polymer material that is substantially free of the glass particles, said layer being formed on at least one surface of the composite article whereby the glass particles are not surface exposed on said at least one surface, and wherein the glass particles comprise:
   about 3 to about 8 wt %, based on the total weight of glass particles, of a first type of glass having an average particle size of less than about 0.07 mm;
   about 8 to about 12 wt %, based on the total weight of glass particles, of a second type of glass having an average particle size from about 0.07 mm to 0.6 mm;
   about 8 to about 12 wt %, based on the total weight of glass particles, of a third type of glass having an average particle size from about 0.6 mm to about 1.2 mm;
   about 30 to about 40 wt %, based on the total weight of glass particles, of a fourth type of glass having an average particle size from about 1.2 mm to about 2.4 mm;
   about 25 to about 35 wt %, based on the total weight of glass particles, of a fifth type of glass having an average particle size from about 2.4 mm to about 6.35 mm; and
   about 8 to about 12 wt %, based on the total weight of glass particles, of a sixth type of glass having an average particle size from about 6.35 mm to about 9.51 mm.

2. The composite article according to claim 1, wherein the matrix comprises, prior to curing:
   about 5 wt % to about 40 wt %, based on a total weight of the matrix material, of a thermosetting polymeric resin; and
   about 60 wt % to about 95 wt %, based on a total weight of the matrix material, of glass particles.

3. The composite article according to claim 2, wherein the matrix further comprises, prior to curing, up to about 1 wt % of one or more of a coupling agent, a wetting agent, and an air release agent.

4. The composite article according to claim 2, wherein the matrix further comprises, prior to curing, one or more of a coloring agent, a cross-linking agent, and a polymerization initiator.

5. The composite article according to claim 1, where the polymer is the cured product of a thermosetting polymeric resin.

6. The composite article according to claim 5, wherein the thermosetting polymeric resin is selected from the group consisting of vinyl ester resins, unsaturated polyester resins, epoxy resins, amino resins, phenolic resins, and combinations thereof.

7. The composite article according to claim 5, wherein the thermosetting polymeric resin is a soy-based, polyester resin.

8. The composite article according to claim 1, wherein the article is in the form of a shower base, countertop, table top, panel, or threshold.

9. The composite article according to claim 1, wherein the matrix further comprises an inorganic filler selected from the group of crystalline silica, amorphous silica, mica, ceramics, minerals, and gem stones.

10. A composite article comprising a matrix formed of a mixture of glass particles and a cured polymer, and a layer consisting of cured polymer material formed on at least one surface of the composite article whereby the glass particles are not surface exposed on said at least one surface.

11. A composite article comprising:
    a matrix consisting of a mixture of glass particles and a cured polymer, and optionally one or more inorganic fillers other than glass, and
    one or more layers consisting of cured polymer material formed on at least one surface of the composite article whereby the glass particles are not surface exposed on said at least one surface.

12. The composite article according to claim 11 wherein the matrix consists of, prior to curing:
    about 5 wt % to about 40 wt % of a thermosetting polymeric resin,
    about 60 wt % to about 95 wt % of glass particles, and
    up to about 20 wt % of the one or more inorganic fillers other than glass.

13. The composite article according to claim 11, wherein the glass particles comprise a mixture of differently sized, irregularly shaped glass particles.

14. The composite article according to claim 13, wherein the glass particles comprise:
   about 20 wt % to about 70 wt %, based on a total weight of the glass particles, of a first glass material having an average particle size ranging from about 0.07 mm to about 0.6 mm; and
   about 30 wt % to about 80 wt %, based on the total weight of the glass particles, of a second glass material having an average particle size ranging from about 0.6 mm to about 10 mm.

15. The composite article according to claim 11, where the polymer is the cured product of one or more thermosetting polymeric resins and optionally one or more of a coupling agent, a wetting agent, an air release agent, a coloring agent, a cross-linking agent, and a polymerization initiator.

16. The composite article according to claim 15, wherein the thermosetting polymeric resin is selected from the group consisting of vinyl ester resins, unsaturated polyester resins, epoxy resins, amino resins, phenolic resins, and combinations thereof.

17. The composite article according to claim 15, wherein the thermosetting polymeric resin is a soy-based, polyester resin.

18. The composite article according to claim 11, wherein the article is in the form of a shower base, countertop, table top, panel, or threshold.

\* \* \* \* \*